United States Patent
Choi et al.

(10) Patent No.: US 12,010,425 B2
(45) Date of Patent: Jun. 11, 2024

(54) OVERLAY MEASUREMENT DEVICE AND METHOD FOR CONTROLLING FOCUS MOVEMENT AND PROGRAM STORAGE MEDIUM THEREFOR

(71) Applicant: AUROS TECHNOLOGY, INC., Hwaseong-si (KR)

(72) Inventors: Seong-Yun Choi, Hwaseong-si (KR); Hyo-Sik Ham, Hwaseong-si (KR)

(73) Assignee: AUROS TECHNOLOGY, INC., Hwaseong-si (KR)

( * ) Notice: Subject to any disclaimer, the term of this patent is extended or adjusted under 35 U.S.C. 154(b) by 0 days.

(21) Appl. No.: 18/205,254

(22) Filed: Jun. 2, 2023

(65) Prior Publication Data
US 2024/0155232 A1    May 9, 2024

(30) Foreign Application Priority Data
Nov. 9, 2022    (KR) .................. 10-2022-0148326

(51) Int. Cl.
*H04N 23/67*    (2023.01)
*G02B 7/105*    (2021.01)

(52) U.S. Cl.
CPC .......... *H04N 23/676* (2023.01); *G02B 7/105* (2013.01)

(58) Field of Classification Search
CPC ............................ H04N 23/676; G02B 7/105
USPC ....................................................... 348/345
See application file for complete search history.

(56) References Cited

U.S. PATENT DOCUMENTS

2019/0019280 A1    1/2019    Rao et al.
2020/0169668 A1*   5/2020    Yamada ............... H04N 23/959

FOREIGN PATENT DOCUMENTS

| JP | S62-278517 A | 12/1987 |
| KR | 10-0394585 B1 | 8/2003 |
| KR | 10-2005-0018186 A | 2/2005 |
| KR | 10-2011-0032250 A | 3/2011 |
| KR | 10-2017-0078902 A | 7/2017 |
| KR | 10-2021-0031015 A | 3/2021 |
| KR | 10-2273278 B1 | 7/2021 |

(Continued)

OTHER PUBLICATIONS

Korean Office Action for related KR Application No. 10-2022-0148326 dated Jan. 3, 2023 from Korean Intellectual Property Office.

(Continued)

*Primary Examiner* — Joel W Fosselman
(74) *Attorney, Agent, or Firm* — Paratus Law Group, PLLC (57) ABSTRACT

There is provided an overlay measurement device controlling a focus movement, which includes: a lighting part being configured to orient lighting toward an overlay measurement target; a collection part comprising an objective lens and a detector for obtaining one or more of images of each focus in the overlay measurement target; a lens focus actuator moving the objective lens to adjust a distance between the objective lens and a wafer; and a processor controlling an operation of the lens focus actuator. The processor obtains a focus graph respectively in relation to two layers from one or more of the images of each focus, and the processor identifies a reference focus in relation to the obtained focus graphs to move the objective lens.

22 Claims, 4 Drawing Sheets

(56) References Cited

FOREIGN PATENT DOCUMENTS

KR   10-2022-0141930 A   10/2022
TW       201908896 A    3/2019

OTHER PUBLICATIONS

Korean Office Action for related KR Application No. 10-2022-0148326 dated May 9, 2023 from Korean Intellectual Property Office.
Korean Notice of Allowance for related KR Application No. 10-2022-0148326 dated Jul. 25, 2023 from Korean Intellectual Property Office.
Taiwanese Office Action for related TW Application No. 112124826 mailed Mar. 15, 2024 from Taiwan Intellectual Property Office.

* cited by examiner

OVERLAY MEASUREMENT DEVICE AND METHOD FOR CONTROLLING FOCUS MOVEMENT AND PROGRAM STORAGE MEDIUM THEREFOR

CROSS-REFERENCE TO RELATED APPLICATION

This application claims priority to Korean Patent Application No. 10-2022-0148326 (filed on Nov. 9, 2022), which is hereby incorporated by reference in its entirety.

BACKGROUND

The present disclosure relates to an overlay measurement device and method for controlling a focus movement and a program storage medium therefor.

With the advancement of technologies, the size of a semiconductor device measuring the characteristics of a wafer decreases, and the density of the integrated circuit of a measurement device increases. For an integrated circuit to be formed on a wafer, a desired circuit structure and desired elements need to be consecutively formed in a specific position, in a series of manufacturing processes. In the manufacturing processes, a patterned layer is consecutively formed on a wafer.

In the repetitive stack processes, an electrically activated pattern is generated in the integrated circuit. At this time, unless each structure is arranged within a range of errors that are allowable in the production process, since electrically activated patterns interfere with one another, the performance and reliability in manufactured circuits deteriorate. To measure and verify an arrangement error among the layers, a focus position is found based on contrast or a phase difference in an image in relation to a wafer.

However, a laser-reflecting surface for an autofocus is not even, making it difficult to find a focus position, conventionally.

SUMMARY

The objective of the present disclosure is to provide an overlay measurement device and a program storage medium therefor that controls a focus movement to find an accurate focal length.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

An overlay measurement device controlling a focus movement, in one embodiment, comprises a lighting part being configured to orient lighting toward an overlay measurement target; a collection part comprising an objective lens and a detector for obtaining one or more of images of each focus in the target; a lens focus actuator moving the objective lens to adjust a distance between the objective lens and a wafer; and a processor controlling an operation of the lens focus actuator, and the processor obtains a focus graph respectively in relation to two layers from one or more of the images of each focus and identifies a reference focus in relation to the obtained focus graphs to move the objective lens.

A method for controlling a focus movement of an overlay measurement device, in one embodiment, may comprise obtaining a focus graph respectively in relation to two layers from one or more of images of each focus; and identifying a reference focus in relation to the obtained focus graphs and moving the objective lens.

A computer-readable storage medium, in one embodiment, comprises a program that comprises instructions for controlling a focus movement of an overlay measurement device, the program comprising instructions for obtaining a focus graph respectively in relation to two layers from one or more of images of each focus; and instructions for identifying a reference focus in relation to the obtained focus graphs and moving an objective lens.

According to the present disclosure, a difference between a reference focus and a focus in a measurement image may be used to control movement of an objective lens through a lens focus actuation such that the position of the reference focus in the measurement image moves, making it possible to find the position of a focus of the highest contrast.

According to the present disclosure, the reference focus may be identified through two focus graphs of a reference image, making it possible to identify contrast indices of two layers of the measurement image.

According to the present disclosure, the difference between the reference focus and the identified focus is deducted from the reference focus value, making it possible to determine a focal length of the objective lens.

Specific effects are described along with the above-described effects in the section of detailed description.

BRIEF DESCRIPTION OF DRAWINGS

The accompanying drawings constitute a part of the specification, illustrate one or more embodiments in the disclosure, and together with the specification, explain the disclosure.

FIG. 4, (a) is an exemplary view showing focus graphs of two layers of a reference image in one embodiment, (b) is an exemplary view showing a contrast index in relation to a reference focus in two layers of an obtained image in one embodiment, (c) is an exemplary view showing that a difference between the contrast indices obtained in (b) is applied to the focus graphs in relation to the image of (a), and (d) is an exemplary view showing that a reference focus is adjusted based on a focus difference obtained in (c).

DETAILED DESCRIPTION

The above-described aspects, features and advantages are specifically described hereafter with reference to the accompanying drawings such that one having ordinary skill in the art to which the present disclosure pertains can embody the technical spirit of the disclosure easily. In the disclosure, detailed description of known technologies in relation to the subject matter of the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component, unless stated to the contrary.

When one component is described as being "in the upper portion (or lower potion)" or "on (or under)" another component, one component can be directly on (or under) another component, and an additional component can be interposed between the two components.

When any one component is described as being "connected", "coupled", or "connected" to another component, any one component can be directly connected or coupled to another component, but an additional component can be "interposed" between the two components or the two components can be "connected", "coupled", or "connected" by an additional component.

Throughout the disclosure, each component can be provided as a single one or a plurality of ones, unless explicitly stated to the contrary.

The singular forms "a", "an" and "the" are intended to include the plural forms as well, unless explicitly indicated otherwise. It is to be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Hereafter, described are an overlay measurement device and method for controlling a focus movement and a program storage medium therefor, in several embodiments.

Figure 1:
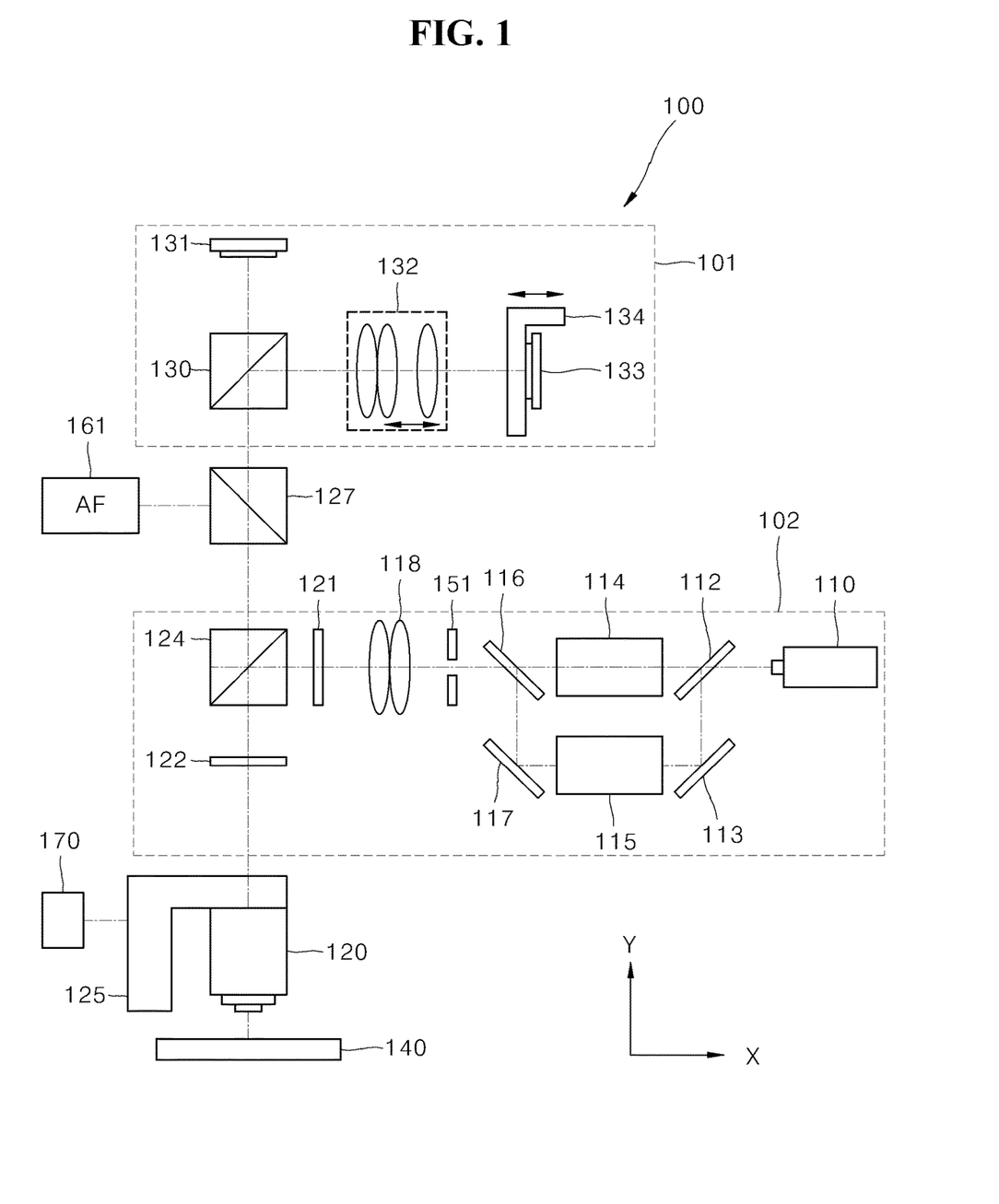
FIG. 1 is a conceptual view showing an overlay measurement device in one embodiment.

FIG. 1 is a conceptual view showing an overlay measurement device in one embodiment.

Referring to FIG. 1, the overlay measurement device 100 in one embodiment measures an error between a first overlay mark (OM1) and a second overlay mark OM2 that are respectively formed in a different layer formed in a wafer 140.

For example, the first overlay mark OM1 may be an overlay mark that is formed in a previous layer, and the second overlay mark OM2 is an overlay mark that is formed in a current layer. The overlay marks are formed in a scribe lane while forming a layer for forming a semiconductor device, in a die area. For example, the first overlay mark OM1 may be formed together with an insulation layer pattern, and the second overlay mark OM2 may be formed together with a photoresist pattern that is formed on the insulation layer pattern.

At this time, the first overlay mark OM1 is covered by the photoresist layer, while the second overlay mark OM2 is exposed to the outside, and the first overlay mark OM1 is made of an oxide having optical properties that differ from those of the second overlay mark OM2 comprised of a photoresist material. Additionally, although the physical position of the first overlay mark OM1 and the physical position of the second overlay mark OM2 are different from each other, the focal surface of the first overlay mark OM1 and the focal surface of the second overlay mark OM2 are identical with each other or different from each other.

The overlay measurement device 100 in one embodiment may comprise a light source 110, a first beam splitter 112, a first mirror 113, a first spectrum filter (a color filter) 114, a second spectrum filter 115, a beam combiner 116, a second mirror 117, a relay lens 118, a polarizing filter 121, an aperture 151, a second detector 133, a focus actuator 134, a zoom lens 132, a first detector 131, a second beam splitter 130, an optical element 127, a third beam splitter 124, a lambda wave plate 122, an objective lens 120, a lens focus actuator 125, an aperture 151, an AF 161, and a processor 170. In the present disclosure, the first spectrum filter and the second spectrum filter may be replaced with various types of filters. Additionally, the spectrum filter may comprise at least one of a filter wheel, a linear translation device, and a flipper device.

For example, the first detector 131, the second beam splitter 130, the zoom lens 132, the second detector 133 and the actuator 134 are configured to orient lighting toward an overlay measurement target, and may be referred to as a lighting part. The lighting part may orient lighting from at least one lighting source toward an overlay measurement target. The overlay measurement target may comprise a wafer, for example.

For example, the light source 110, the first beam splitter 112, the first mirror 113, the first spectrum filter (a color filter) 114, the second spectrum filter 115, the beam combiner 116, the second mirror 117, the aperture 151, the relay lens 118, the polarizing filter 121, the lambda wave plate 122, and the third beam splitter 124 may be provided to obtain one or more images in relation to a focus in the target, and referred to as a collection part. The collection part may comprise an objective lens and a detector, for example.

FIG. 1 shows a configuration of the overlay measurement device 100 in one embodiment, and components of the overlay measurement device 100 are not limited to those of the embodiment illustrated in FIG. 1. When necessary, some of the components can be added, changed or removed. For example, the overlay measurement device 100 may comprise a memory (not illustrated) that stores instructions, programs, logics and the like that enable the processor 170 to control the operation of each component of the overlay measurement device 100.

In one embodiment, a halogen lamp, a xenon lamp, a supercontinuum laser, a light-emitting diode, a laser induced lamp and the like may be used as the light source 110.

In one embodiment, the first beam splitter 112 splits a beam irradiated from the light source 110 into two beams. The first beam splitter 112 transmits some of the beam irradiated from the light source 110, and reflects some of the beam irradiated from the light source 110, to split the beam into two beams.

In one embodiment, the first mirror 113 is disposed between the first beam splitter 112 and the second spectrum filter 115, and changes the path of the beam reflected by the first beam splitter 112 toward the second spectrum filter 115.

In one embodiment, the first spectrum filter 114 adjusts the central wavelength and bandwidth of the beam having passed through the first beam splitter 112, out of the beams split by the first beam splitter 112, such that the central wavelength and bandwidth may be appropriate to obtain the image of the second overlay mark OM2 formed in the current layer. Any one of a filter wheel, a linear translation device and a flipper device may be used as the spectrum filter.

In one embodiment, the second spectrum filter 115 adjusts the central wavelength and bandwidth of the beam reflected from the first beam splitter 112, out of the beams split by the first beam splitter 112, such that the central wavelength and bandwidth may be appropriate to obtain the image of the first overlay mark OM1 formed in the previous layer.

In one embodiment, the beam combiner 116 combines the light having passed through the first spectrum filter 114 and the light having passed through the second spectrum filter 115. The light having passed through the first spectrum filter 114 passes through the beam combiner 116, and the beam having passed through the second spectrum filter 115 is reflected by the beam combiner 116 and is combined with the beam having passed through the beam combiner 116, after its path is changed by the second mirror 117 toward the beam combiner 116, and then passes through the aperture 151.

In one embodiment, the aperture 151 (e.g., a pin hole) changes the beam having passed through the beam combiner such that the beam may be appropriate to photograph the first overlay mark OM1.

In one embodiment, the second detector 133 detects the beam reflected by the second beam splitter 130. The second detector 133 is disposed at the focus actuator 134, and a distance between the second beam splitter 130 and the second detector 133 is adjusted. The second detector 133 obtains the image of the first overlay mark OM1.

In one embodiment, the first detector 131 detects the beam having passed through the second beam splitter 130. The first detector 131 may obtain the image of the second overlay mark OM2.

Alternatively, the first detector only may obtain the image of the first overlay mark OM1 and the image of the second overlay mark OM2, while the second detector does not operate, depending on user settings.

In one embodiment, the zoom lens 132 is disposed between the second beam splitter 130 and the focus actuator 134. The zoom lens 132 receives a position change value of the second detector 133 from the focus actuator 134, and based on the position change value, matches the magnification of the image of the second overlay mark OM2 and the magnification of the image of the first overlay mark OM1. Since an optical path distance between the second detector 133 and the second beam splitter 130 differs from an optical path distance between the first detector 131 and the second beam splitter 130 depending on a difference in the heights of the first overlay mark OM1 and the second overlay mark OM2, the magnification of the image obtained by the first detector 131 and the magnification of the image obtained by the second detector 133 may differ. To measure an overlay error accurately, the magnifications need to be matched.

In one embodiment, the second beam splitter 130 splits the beam gathered by the objective lens 120 into two beams. The second beam splitter 130 may comprise a tube beam splitter and a dichroic filter. The dichroic filter transmits a beam of a specific wavelength. The beam gathered by the objective lens 120 passes through the lambda wave plate 122, the third beam splitter 124 and the optical element 127 and is split into two beams by the second beam splitter 130. That is, the beam gathered by the objective lens 120 splits into a beam appropriate to detect the first overlay mark OM1 and a beam appropriate to detect the second overlay mark OM2.

In one embodiment, the optical element 127 may comprise a hot mirror and a cold mirror.

In one embodiment, the third beam splitter 124 splits the beam combined through the beam combiner 116 into two beams again. The beam combined through the beam combiner 116 is split into two beams by the third beam splitter 124, through the relay lens 118 and the polarizing filter 121, in a polarized state.

In one embodiment, the objective lens 120 concentrates the beam, being combined by the combiner 116, being reflected by the third beam splitter 124 and then becoming one beam of polarized light, through the lambda wave plate 122, on the measurement position of a wafer, and gathers a beam being reflected in the measurement position. The objective lens 120 is disposed at the lens focus actuator 125.

In one embodiment, the lens focus actuator 125 adjusts a distance between the objective lens 120 and a wafer 140 such that a focal surface may be placed at the first overlay mark OM1 or the second overlay mark OM2. The lens focus actuator 125 moves the objective lens 120 perpendicularly toward the wafer (e.g., in the Y direction), under the control of the processor 170, to adjust a focal length.

In one embodiment, the optical element 127 is installed in a way that the optical element and the path of the beam having passed through the beam splitter form an angle of 45°, to send out the beam to an auto focus module, and is characterized by reflecting a long-wavelength beam and transmitting a short-wavelength beam, or reflecting a short-wavelength beam and transmitting a long-wavelength beam. The optical element may be comprised of one of a hot mirror or a cold mirror.

The auto focus sensor obtains a signal based on the position of a focus by using a reflected light reflected from the measurement area of a wafer, and to adjust the position of the focus, the actuator adjusting a distance between the measurement area of the wafer and the objective lens is adjusted.

At a time when a focus is scanned, the first detector 131 may obtain first images (e.g., reference images) at each measurement point. For example, the reference images may comprise one or more images of each focus.

In one embodiment, the processor 170 may obtain a focus graph (e.g., a first focus graph and a second focus graph) in relation to each of the two layers (e.g., a first layer and a second layer) of the first images (e.g., reference images), and identify one of a midpoint, a maximum value of each layer, and a maximum value out of minimums between the two layers as a reference focus in relation to the obtained focus graph. For example, the processor 170 may determine a focus (e.g., 395) corresponding to an average of a first maximum contrast index (e.g., 350) on the first focus graph and a second maximum contrast index (e.g., 440) on the second focus graph as the reference focus.

In one embodiment, as measurement images are obtained from the detector, the processor 170 may identify a contrast index, based on each of the focus graphs (e.g., a third focus graph and a fourth focus graph) of two layers (e.g., a third layer and a fourth layer) of the measurement images that are obtained based on the identified reference focus. The processor 170 may obtain an image corresponding to a current position of the objective lens 120, through the detector. The processor 170 may obtain an image, based on the movement of a stage on which a wafer 140 is placed.

In one embodiment, the processor 170 may identify a reference focus (e.g., 500) by using a first focus graph of a first layer of a first image (e.g., a reference image) and a second focus graph of a second layer of the first image. Then the processor 170 may identify two third contrast indices in relation to the identified reference focus, based on a third focus graph of a second image (e.g., a measurement image), and identify two fourth contrast indices in relation to the identified reference focus, based on a fourth focus graph of the measurement image.

In one embodiment, the processor 170 may identify one third contrast index and one fourth contrast index that have a minimum focal length, out of the two third contrast indices and the two fourth contrast indices. Then the processor 170 may identify whether a focus value corresponding to one third contrast index identified is identical with a focus value corresponding to one fourth contrast index identified.

In one embodiment, the processor 170 may identify a focus corresponding to each contrast index that is identified through each of the two layers of a reference image, and calculate a difference (e.g., 50) between the reference focus (e.g., 500) and the identified focus 550.

Then the processor 170 may move the objective lens 120 to a focus corresponding to the measurement image, based on the calculated difference. The processor 170 may adjust a focal length of the objective lens 120 by controlling the lens focus actuator 125.

For example, the processor 170 deducts the calculated difference from the value of the reference focus, and operates the lens focus actuator 125 to move the objective lens 120 to a position corresponding to the deducted focus.

In one embodiment, the processor 170 may control the movement of the objective lens 140, through the lens focus actuator 125, based on the calculated difference, in relation to each measurement point of a wafer.

The processor 170 may be additionally provided in the overlay measurement device, or programmed and stored in another component.

Figure 2:
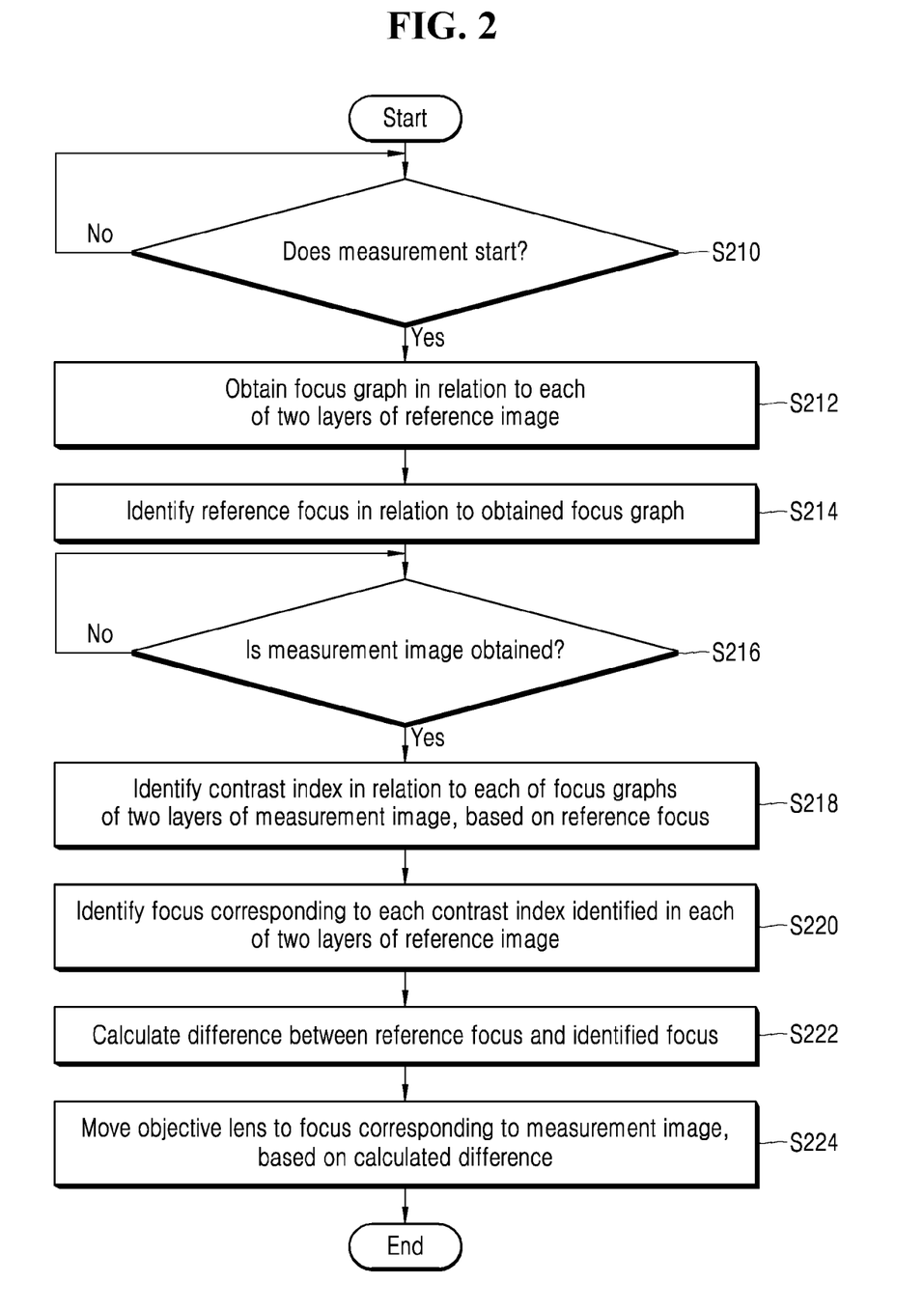
FIG. 2 is a flowchart showing a method for controlling a focus movement of the overlay measurement device in one embodiment.
Figure 3:
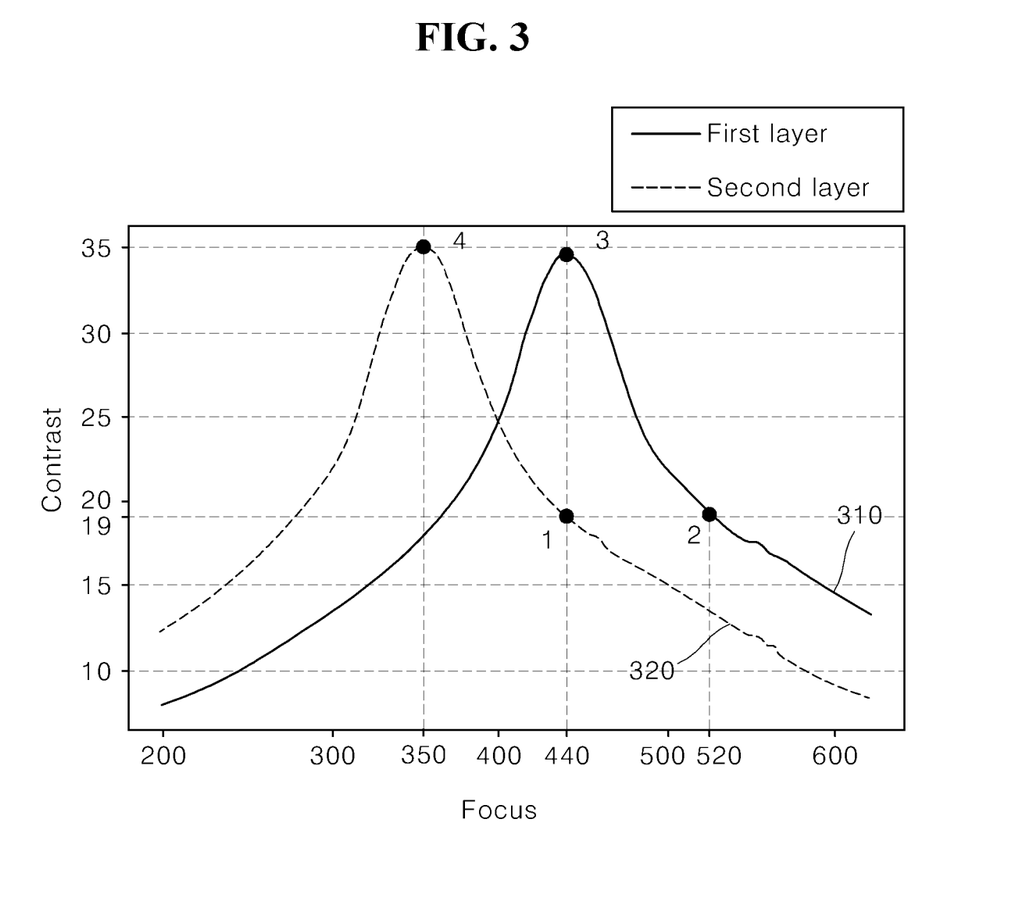
FIG. 3 is an exemplary view showing focus graphs of two layers in one embodiment.
Figure 4:
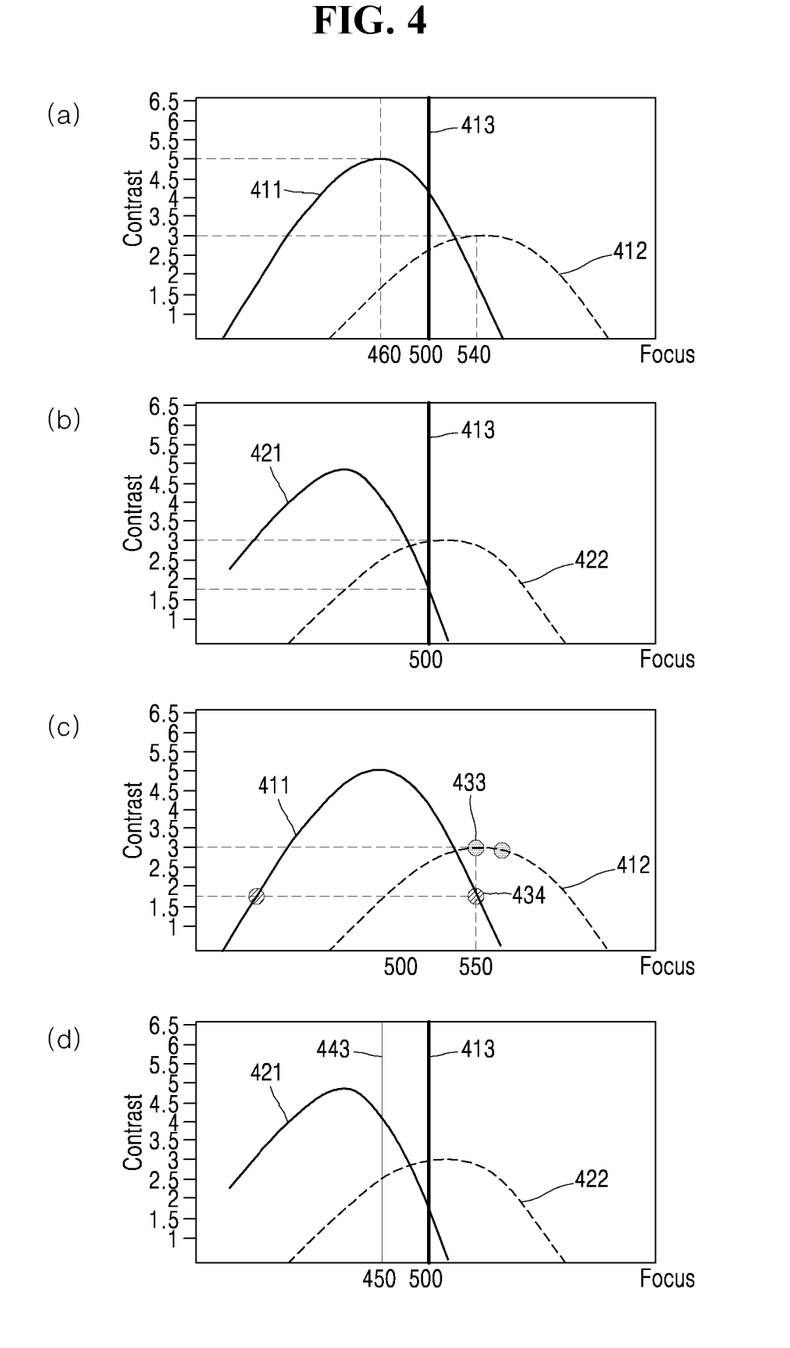

FIG. 2 is a flowchart showing a method for controlling a focus movement of the overlay measurement device in one embodiment. FIG. 3 is an exemplary view showing focus graphs of two layers in one embodiment. FIG. 4, (*a*) is an exemplary view showing focus graphs of two layers of a reference image in one embodiment, (*b*) is an exemplary view showing a contrast index in relation to a reference focus in two layers of an obtained image in one embodiment, 4(*c*) is an exemplary view showing that a difference between the contrast indices obtained in (*b*) is applied to the focus graphs in relation to the image of (*a*), and 4(*d*) is an exemplary view showing that a reference focus is adjusted based on a focus difference obtained in (*c*).

Hereafter, a method for controlling a focus movement of the overlay measurement device in one embodiment is described with reference to FIG. 2, FIG. 3, and FIG. 4, (*a*) to (*d*).

In one embodiment, the processor 170 may identify whether the overlay measurement device starts measurement (S210). The processor 170 may determine whether the first detector starts to measure contrast in relation to a measurement point (e.g., a site).

In one embodiment, the processor 170 may obtain a focus graph in relation to each of the two layers of a reference image (S212). Confirming that an operation of measuring contrast in relation to a wafer starts, the processor 170 may obtain a focus graph of each of the two layers of the reference image from the memory (not illustrated).

Referring to FIG. 3, one image may comprise a plurality of layers (e.g., two layers). In each of the layers, the contrast of each focus position may differ, and the processor 170 may identify a focus graph indicating the contrast of a corresponding layer, through a contrast index at each focus position.

For example, a first focus graph 310 indicates a contrast index in relation to a first layer (e.g., a previous layer), and a second focus graph 320 indicates a contrast index in relation to a second layer (e.g., a current layer).

For example, in the case of a first focus graph 310, a focus has a maximum contrast index 35 at 440, and in the case of a second focus graph 320, a focus has a maximum contrast index 35 at 350.

For example, two focuses 440, 520 have the same contrast index (e.g., 19) in one focus graph (e.g., the first focus graph 310).

Confirming that the operation of measuring contrast starts in relation to a wafer, the processor 170, as described above, may obtain a focus graph in relation to each of the two layers of the reference image.

In one embodiment, the processor 170 may identify a reference focus in relation to the obtained focus graph (S214). The processor 170 may determine one of a midpoint, a maximum value of each layer, and a maximum value out of minimums between the two layers as the reference focus, by using a focus graph of each of the two layers in the reference image. The processor 170 may identify a focus position having a maximum contrast index through each focus graph.

Referring to FIG. 4, (*a*), the processor 170 may obtain a reference image. Then the processor 170 may identify a focus (e.g., 460) having a maximum contrast index (e.g., 5) through a first focus graph 411 of the first layer (e.g., a previous layer) in the reference image. Additionally, the processor 170 may identify a focus (e.g., 540) having a maximum contrast index (e.g., 3) through a second focus graph 412 of the second layer (e.g., a current layer).

Then the processor 170 may identify a focus position (e.g., 500) of a reference focus 413 as a reference by using a focus position (e.g., 460, 540) corresponding to the maximum contrast index (e.g., 5, 3) in each of the layers (e.g., the first layer, the second layer).

For example, the processor 170 may determine an average of the focus position (e.g., 460, 540) having the maximum contrast index (e.g., 5, 3) as a focus position (e.g., 500) in relation to the reference focus 413.

In one embodiment, the processor 170 may identify whether a measurement image is obtained (S216). The processor 170 may obtain a measurement image in relation to a wafer to be measured from the detector.

In one embodiment, the processor 170 may identify a contrast index, based on the reference focus and based on two layers of the measurement image (e.g., virtual focus graphs of two layers) (S218). As the measurement image in relation to the wafer is obtained, the processor 170.

The processor 170 may identify a contrast index in relation to each of the two layers of the measurement image by using the reference focus 413 in the reference image.

Referring to FIG. 4, (*b*), the processor 170 may identify a first contrast index (e.g., 1.75) based on the first focus graph 421 in relation to the first layer of the measurement image, and a second contrast index (e.g., 3) based on the second focus graph 422 in relation to the second layer of the measurement image, with respect to the reference focus 413 of the reference image.

For example, the first focus graph 421 and the second focus graph 422 are illustrated in FIG. 4 to describe the subject matter of the present disclosure. However, the processor 170 may not generate the first focus graph 421 in relation o the first layer and the second focus graph 422 in relation to the second layer. That is, as the measurement image is obtained, the processor 170 may identify the contrast indices of the two layers of the measurement image, based on the reference focus.

In one embodiment, the processor 170 may identify a focus corresponding to each of the contrast indices that are identified respectively in the two layers of the reference image (S220). The processor 170 may calculate a difference between the first contrast index (e.g., 1.75) and the second contrast index (e.g., 3) that are identified in the above process (S218), and identify an index having the same difference as the calculated difference through the two focus graphs of the reference image.

The processor 170 may calculate a contrast index difference (e.g., 3-1.75=1.25), based on the two focus graphs 421, 422 of the measurement image, with respect to the reference focus 413. Additionally, the processor 170 may determine a focus position corresponding to the calculated contrast index difference (e.g., 1.25) through the two focus graphs, in the reference image. Referring to FIG. 4, (*c*), the processor 170 may determine which focus has the same contrast index difference as the contrast index difference (e.g., 1.25) in FIG. 4, (*b*).

For example, the processor 170 may determine that two points have a contrast index of 1.75 in the first focus graph 411, and that two points have a contrast index of 3 in the second focus graph 412. Then the processor 170 may identify points (e.g., 433, 434) having the same focus, out of the two points on the first focus graph 411 and out of the two points on the second focus graph 412.

The processor 170, as described above, may determine that a first point 434 of the first focus graph 411 and a second point 433 of the second focus graph 412 are the points having the same contrast index difference as the contrast index difference (e.g., 1.25) in FIG. 4, (*b*), and may determine the first point 434 and the second point 433 as an identified focus.

In one embodiment, the processor 170 may calculate a difference between the reference focus and the identified focus (S222). The processor 170 deducts the reference focus value (500) from the identified focus value (e.g., 550) to calculate a focus difference (e.g., 50).

In one embodiment, the processor 170 may move the objective lens to a focus corresponding to the measurement image, based on the calculated difference (S224). The processor 170 may determine a reference focus in the measurement image by using the focus difference.

Referring to FIG. 4, (*d*), the processor 170 may control the lens focus actuator 125 to adjust a focal length of the objective lens 120 from the position (e.g., 500) of the reference focus 413 to the position (450) of the identified focus 433.

In the present disclosure, a reference focus is identified through a focus graph in relation to each of the two layers of a reference image, and based on a difference between the identified reference focus and a focus identified through a measurement image, the focal length of the objective lens 120 is adjusted, to find a focus position of highest contrast in the measurement image, as described above.

Each of the above-described steps in the flowcharts may be performed regardless of the order illustrated, or performed at the same time. Further, in the present disclosure, at least one of the components, and at least one operation performed by at least one of the components can be embodied as hardware and/or software.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the range of the disclosure though not explicitly described in the description of the embodiments.

The invention claimed is:

1. An overlay measurement device controlling a focus movement, comprising:
   a lighting part being configured to orient lighting toward an overlay measurement target;
   a collection part comprising an objective lens and a detector for obtaining one or more of images of each focus in the overlay measurement target;
   a lens focus actuator moving the objective lens to adjust a distance between the objective lens and a wafer; and
   a processor controlling an operation of the lens focus actuator,
   wherein the processor is configured to:
   obtain a first focus graph of a first layer and a second focus graph of a second layer from one or more of the images of each focus,
   identify a reference focus in relation to the obtained first focus graph and the obtained second focus graph,
   identify a first contrast index and a second contrast index for each of the first layer and the second layer of the obtained measurement image,
   identify a focus corresponding to each of the identified first contrast index and the identified second contrast index,
   deduct a difference between the identified reference focus and the identified focus from the reference focus, and
   move the objective lens to a focus corresponding to the measurement image by the deducted difference.

2. The overlay measurement device of claim 1, wherein the processor identifies a third contrast index of each of the first layer and the second layer of the measurement image, and
   the processor identifies a fourth contrast index of each of the first layer and the second layer of the measurement image.

3. The overlay measurement device of claim 2, wherein the processor identifies one third contrast index and one fourth contrast index that have a shortest focal length between the third contrast index of each of the first layer and the second layer and between the fourth contrast index of each of the first layer and the second layer.

4. The overlay measurement device of claim 3, wherein the processor identifies whether a focus value corresponding to one third contrast index identified is identical with a focus value corresponding to one fourth contrast index identified.

5. The overlay measurement device of claim 1, wherein the processor determines a focus corresponding to an average between the first layer and the second layer, a maximum value of each of the first layer and the second layer, and a maximum value out of minimums between the first layer and the second layer as the reference focus.

6. The overlay measurement device of claim 1, wherein the processor deducts the calculated difference from the reference focus value, and
   the processor operates the lens focus actuator, and moves the objective lens to correspond to a position of the deducted focus.

7. The overlay measurement device of claim 1, wherein the processor controls a movement of the objective lens through the lens focus actuator, based on the calculated difference, at each measurement point of the wafer.

8. The overlay measurement device of claim 1, wherein the processor obtains an image corresponding to a current position of the objective lens through the detector.

9. The overlay measurement device of claim 8, wherein the processor obtains an image, based on a movement of a stage on which the wafer is placed.

10. A method for controlling a focus movement of an overlay measurement device, comprising:
   obtaining a first focus graph of a first layer and a second focus graph of a second layer from one or more of images of each focus;
   identifying a reference focus in relation to the obtained first focus graph and the obtained second focus graph and moving the objective lens;
   identifying a first contrast index and a second contrast index for each of the first layer and the second layer of the obtained measurement image,
   identifying a focus corresponding to each of the identified first contrast index and the identified second contrast index,
   deducting a difference between the identified reference focus and the identified focus from the reference focus, and
   moving the objective lens to a focus corresponding to the measurement image by the deducted difference.

11. The method of claim 10, moving the objective lens, comprising:
   as a measurement image is obtained, identifying a first contrast index and a second contrast index in relation to each of the first layer of the second layer of the obtained measurement image, based on the identified reference focus; and
   identifying a focus corresponding to each of the identified first contrast index and the identified second contrast index in each of the first layer and the second layer of one or more of the images of each focus.

12. The method of claim 11, moving the objective lens, comprising:
   calculating a difference between the reference focus and the identified focus, and
   moving the objective lens to a focus corresponding to the measurement image, based on the calculated difference.

13. The method of claim 12, identifying a focus corresponding to each of the identified first contrast index and the identified second contrast index, comprising:
   identifying a third contrast index of each of the first layer and the second layer of the measurement image, and
   identifying a fourth contrast index of each of the first layer and the second layer of the measurement image.

14. The method of claim 12, moving the objective lens, comprising:
   deducting the calculated difference from the reference focus value, and
   moving the objective lens to correspond to a position of the deducted focus.

15. The method of claim 12, wherein the method further comprises controlling a movement of the objective lens, based on the calculated difference, at each measurement point of the wafer.

16. The method of claim 12, wherein the method further comprises obtaining an image corresponding to a current position of the objective lens.

17. The method of claim 10, wherein identifying the reference focus comprises determines a focus corresponding to an average between the first layer and the second layer, a maximum value of each of the first layer and the second layer, and a maximum value out of minimums between the first layer and the second layer as the reference focus.

18. The method of claim 13, wherein the method further comprises identifying one third contrast index and one fourth contrast index that have a shortest focal length between the third contrast index and between the fourth contrast index.

19. The method of claim 18, wherein identifying one third contrast index and one fourth contrast index comprises identifying whether a focus value corresponding to one third contrast index identified is identical with a focus value corresponding to one fourth contrast index identified.

20. A non-transitory computer-readable storage medium comprising a program that comprises instructions for controlling a focus movement of an overlay measurement device,
   the program comprising:
   instructions for obtaining a first focus graph of a first layer and a second focus graph of a second layer from one or more of images of each focus;
   instructions for identifying a reference focus in relation to the obtained first focus graph and the obtained second focus graph and moving an objective lens;
   instructions for identifying a first contrast index and a second contrast index for each of the first layer and the second layer of the obtained measurement image;
   instructions for identifying a focus corresponding to each of the identified first contrast index and the identified second contrast index;
   instructions for deducting a difference between the identified reference focus and the identified focus from the reference focus; and
   instructions for moving the objective lens to a focus corresponding to the measurement image by the deducted difference.

21. The non-transitory computer-readable storage medium of claim 20, the program comprising:
   instructions for identifying a first contrast index and a second contrast index in relation to each of the first layer and the second layer of a measurement image, based on the identified reference focus, as the measurement image is obtained; and
   instructions for identifying a focus corresponding to each of the identified first contrast index and the identified second contract index in each of the first layer and the second layer of one or more of the images of each focus.

22. The non-transitory computer-readable storage medium of claim 21, the program comprising:
   instructions for calculating a difference between the reference focus and the identified focus; and
   instructions for moving the objective lens to a focus corresponding to the measurement image, based on the calculated difference.

* * * * *